US009205910B1

(12) United States Patent
Campbell et al.

(10) Patent No.: US 9,205,910 B1
(45) Date of Patent: Dec. 8, 2015

(54) CARGO AIRCRAFT FOR TRANSPORTING INTERMODAL CONTAINERS IN TRANSVERSE ORIENTATION

(71) Applicant: The Boeing Company, Chicago, IL (US)

(72) Inventors: Lowell B. Campbell, Mukilteo, WA (US); Victor Ken Stuhr, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/830,867

(22) Filed: Aug. 20, 2015

Related U.S. Application Data

(62) Division of application No. 13/968,422, filed on Aug. 15, 2013, now Pat. No. 9,139,283.

(51) Int. Cl.
*B64C 1/22* (2006.01)
*B64C 1/00* (2006.01)
*B64C 25/10* (2006.01)

(52) U.S. Cl.
CPC ............... *B64C 1/22* (2013.01); *B64C 1/0009* (2013.01); *B64C 25/10* (2013.01)

(58) Field of Classification Search
CPC ...... B64C 1/22; B64C 1/1415; B64C 1/0009; B64C 2001/0045; B64D 9/00; B64B 2201/00; B64B 1/22
See application file for complete search history.

(56) References Cited

U.S. PATENT DOCUMENTS

| | | | |
|---|---|---|---|
| 2,380,290 | A | 7/1945 | Burnelli |
| 3,861,541 | A | 1/1975 | Taft et al. |
| 7,093,798 | B2 | 8/2006 | Whelan et al. |
| 7,261,257 | B2 | 8/2007 | Helou, Jr. |
| 7,344,109 | B1 | 3/2008 | Rezai |
| 8,708,282 | B2 * | 4/2014 | Helou, Jr. ................. B64C 1/00 244/118.2 |
| 2006/0108477 | A1 | 5/2006 | Helou |
| 2010/0308180 | A1 * | 12/2010 | Helou, Jr. ................. B64C 1/00 244/35 R |

FOREIGN PATENT DOCUMENTS

| | | |
|---|---|---|
| DE | 4218239 A1 | 12/1993 |
| DE | 102004017785 A1 | 11/2005 |

(Continued)

OTHER PUBLICATIONS

"Air Freight Container Specifications", I.B.A. Freight Services, [Online]. Retrieved from the Internet: <www.iba.com.eg/aircontainers.shtml >, Accessed on Aug. 14, 2013, 2009, 4 pgs.

(Continued)

*Primary Examiner* — Brian M O'Hara
(74) *Attorney, Agent, or Firm* — Kwan & Olynick LLP

(57) ABSTRACT

Provided are aircraft for transporting intermodal containers and methods of operating such aircraft including methods of loading and unloading the containers. An aircraft includes a fuselage having a cargo space for receiving and supporting intermodal containers. The containers are oriented in the transverse direction in the cargo space or, more specifically, in a direction normal to the longitude direction that extends from the nose to the tail of the aircraft. The aircraft may transport standard 20-foot or 40-foot containers or lighter version of such containers that otherwise have the same form and features as the standard intermodal containers. The intermodal containers may be loaded through an opening in the bottom of the fuselage. Specifically, intermodal containers may be arranged into a row. The aircraft may be then rolled over this row of the containers and lowered onto the containers followed by engaging container corners.

20 Claims, 14 Drawing Sheets

(56) References Cited

FOREIGN PATENT DOCUMENTS

| EP | 1332961 | B1 | 12/2007 |
| EP | 2404826 | A1 | 1/2012 |

OTHER PUBLICATIONS

"U.S. Appl. No. 13/968,422, Notice of Allowance mailed Jul. 24, 2015", 9 pgs.

* cited by examiner

CARGO AIRCRAFT FOR TRANSPORTING INTERMODAL CONTAINERS IN TRANSVERSE ORIENTATION

CROSS-REFERENCE TO RELATED APPLICATIONS

This application is a divisional of U.S. application Ser. No. 13/968,422, entitled "CARGO AIRCRAFT FOR TRANSPORTING INTERMODAL CONTAINERS IN TRANSVERSE ORIENTATION," filed on 15 Aug. 2013, which is incorporated herein by reference in their entirety for all purposes.

TECHNICAL FIELD

This disclosure generally relates to cargo aircraft and, more specifically, to cargo aircraft for transporting intermodal containers arranged in transverse orientation in the cargo compartment of the aircraft.

BACKGROUND

Currently most cargo is shipped worldwide as either low priority cargo or high priority cargo. These two categories are very distinct in terms of their shipping duration and cost. The low priority cargo is predominantly shipped using container ships and to a lesser extent using trucks and trains. Intermodal containers are used for collective handling of shipped articles stored in those containers, which allows using standard loading and unloading equipment, efficient stacking, and realizing many other cost savings. Intercontinental shipments may take weeks if not months. Even long range intracontinental shipments can take a few days and even weeks. The high priority cargo is shipped using cargo aircraft, such as jet freighters. Passenger aircraft or, more specifically, cargo area of the passenger aircraft can be also used for the high priority cargo shipments. The high priority cargo is delivered in an essentially overnight mode and mostly limited to small and light articles. Standard intermodal containers are not used because of their large size and heavy weight as well as inability of most aircraft to receive and/or transport the intermodal containers.

Huge disparities in the total shipped weight and total shipping cost exist between these two transportation modalities, i.e., the low priority cargo and the high priority cargo. The low priority cargo represents the overwhelming majority of the total shipped weight, while the high priority cargo still dominates from the total shipping cost perspective. In light of these two extremes, a great need for intermediate shipping solutions exists.

One of the main cost savings in the low priority cargo category comes from use of intermodal containers, such as 20-foot containers and 40-foot containers. These containers can be loaded at their shipping points and then transported by cargo ships, trains, and/or trucks to their final destinations without a need of handling individual articles stored in these containers. An intermodal container is handled as a single unit. The standard sizes and intermodal nature of these containers have greatly facilitated and lowered the cost of the low priority cargo. Various handling equipment has been developed, which further reduced the overall shipping costs.

However, intermodal containers have not been adopted for aircraft transportation with a few rare exceptions. As such, cost savings from use of intermodal containers have not been realized in aircraft transportation. Standard intermodal containers proved to be too large and too heavy for modern aircraft. Even the largest cargo aircraft can only fit a few 20-foot containers. Use of 40-foot containers on modern aircraft is even less feasible.

This lack of adoption comes from specific design and use of aircraft. Specifically, modern aircraft have not been designed to handle the intermodal containers. Instead, cargo aircraft are typically first designed as passenger aircraft and then adapted for cargo handling applications without major changes to fuselage, wings, and other major components of the aircraft. For example, most cargo aircraft have cylindrical fuselages suitable for high cruising speeds, high altitudes, and pressurized cabins. However, the cylindrical fuselages are not optimal for transporting intermodal containers. The standard 20-foot and 40-foot intermodal containers can only fit into such fuselage laterally and, as such, are not capable of fully occupying the available cargo space in an aircraft. Furthermore, most cargo aircraft typically lack large access ports, which complicates loading and unloading of bulky articles, such as intermodal containers. Military transport aircraft are also not generally compatible with intermodal cargo transportation system as these aircraft are designed with specific cargo in mind used in the military, such as rolling equipment (e.g., tanks and trucks), palletized cargo, or irregularly shaped cargo. Also, military aircraft are often designed with specific military missions in mind rather than with a focus on low transportation costs and ability to integrate with other civilian modes of transportation.

The inability of modern aircraft to efficiently transport a large number of intermodal containers has significantly limited expansion of aircraft transport. It should be noted that transportation not only includes carrying the intermodal containers to new locations but also loading and unloading the containers into aircraft. At the same time, new business strategies (e.g., just-in-time supply) and globalization of markets have created a strong demand for faster shipping, which often cannot be addresses by ships, trains, and/or trucks, yet demands lower costs, which cannot be realized using modern aircraft. Aircraft specifically designed to transport intermodal containers can bridge this gap and provide new transportation modality not covered by the current high and low priority options.

SUMMARY

Provided are aircraft for transporting intermodal containers and methods of operating such aircraft including methods of loading and unloading the containers. An aircraft includes a fuselage having a cargo space for receiving and supporting intermodal containers. The containers are oriented in the transverse direction in the cargo space or, more specifically, in a direction normal to the longitude direction that extends from the nose to the tail of the aircraft. The aircraft may transport standard size intermodal containers, such as 40-foot containers, or lighter version of such containers that otherwise have the same form and features as the standard intermodal containers. The intermodal containers may be loaded through an opening in the bottom of the fuselage. Specifically, intermodal containers may be arranged into a row. The aircraft may be then rolled over this row of the containers and lowered onto the containers followed by engaging container corners.

In some embodiments, an aircraft for transporting intermodal containers includes a fuselage having a cargo space. The fuselage extends in the longitude direction between the nose and the tail of the aircraft. The cargo space is configured to receive and support multiple intermodal containers. Each intermodal container extends in the transverse direction when in the cargo space. As such, the intermodal containers have the transverse orientation when loaded in the cargo space. The intermodal containers may have a length of at least 30 feet measured in the transverse direction. The width may not exceed 15 feet in the longitudinal direction. In some embodiments, a length may be about 40 feet or for variations of this embodiment, about 45 feet or 53 feet, the length defined in the transverse direction. For example, standard intermodal containers (that are also used for ship, train, and truck shipment) may be loaded into the aircraft.

In some embodiments, the cargo space is an unpressurized cargo space. Specifically, the cargo space and the intermodal containers disposed in the cargo space during operation of the aircraft may be subjected to the ambient conditions at the operating altitude. In some embodiments, the aircraft is a low altitude aircraft. For purposed of this documents, the low altitude aircraft is defined as an aircraft flying at an altitude of less than 18,000 feet. The low altitude operation of aircraft reduces the pressurization effects on the cargo inside the containers and is the most fuel efficient altitude for medium speed aircraft. For example, a fuselage may have a width being at least twice greater than the height or even at least four times greater that the height. Such wide but short fuselages are particularly suitable for transporting intermodal containers in the transverse orientation. A standard intermodal container has a height of only about 8 feet, while the length may be at least 30 feet measured in the transverse direction. In some embodiments, the length is about 40 feet, or for half size containers, 20 feet. Furthermore, the non-cylindrical fuselages may be shaped as airfoils providing additional lift to the aircraft.

In some embodiments, the fuselage has an opening at a bottom of the fuselage. The opening provides access to the cargo space and may be used to receive the intermodal containers into the cargo space. As such, containers may be loaded and unloaded through this bottom opening. In some embodiments, the opening allows receiving all intermodal containers into the cargo space simultaneously. In this case, the opening is larger than the footprint of the containers arranged for loading into the cargo space. The containers do not need to be moved transversely or longitudinally once raised into the cargo space. In some embodiments, the aircraft also includes a bottom cover detachably connected to the fuselage and covering the opening at the bottom of the fuselage. Alternatively, the opening may remain uncovered during operation of the aircraft and bottom sides of the intermodal containers may be exposed.

In some embodiments, the fuselage includes a frame. The frame may define the boundaries of the cargo space. The frame may include top supporting mechanisms, such as top twist-lock fasteners, for engaging with top corners of the intermodal containers. The top supporting mechanisms (e.g., the twist-lock fasteners) may be actuated to engage and disengage the top corners of the containers using an actuating mechanism of the aircraft, such as a pneumatic actuating mechanism or a hydraulic actuating mechanism. In some embodiments, the top supporting mechanisms (e.g., the top twist-lock fasteners) are configured to be inserted into the top corners of the intermodal containers in a vertical direction, i.e., in the direction normal to the transverse direction and normal to the longitude direction. For example, the top supporting mechanisms (e.g., the top twist-lock fasteners) may be inserted into the top corners during lowering of the aircraft onto the row of the containers.

In some embodiments, the frame further also includes bottom supporting mechanisms (e.g., bottom twist-lock fasteners) for engaging with bottom corners of the intermodal containers. For example, the bottom supporting mechanisms (e.g., the bottom twist-lock fasteners) are configured to be inserted into the bottom corners of the intermodal containers in the transverse direction. The bottom supporting mechanisms fasteners may be also used to support the cover after loading of the containers.

The aircraft may also include a landing gear attached to the fuselage. The landing gear may extend and retract in order to the change the ground clearance of the fuselage. In some embodiments, the landing gear in a retracted position may provide a ground clearance of at least about 8 feet to the fuselage. This large clearance allows the aircraft to roll over the row of the containers without hitting the containers. The landing gear may have a track exceeding the length of the intermodal containers, i.e., the track being greater than 40 feet or for variations of this embodiment, greater than 45 or 53 feet. The landing gear is configured to change the ground clearance of the fuselage by at least about 8 feet when receiving the intermodal containers into the cargo space. As such, the landing gear may be used to lower the aircraft onto a set of intermodal containers such that these intermodal containers protrude into the cargo space of the aircraft during lowering. Alternatively, intermodal containers may be raised into cargo space by an external loading device.

In some embodiments, the fuselage has an airfoil shape producing an aerodynamic force during the flight. The airfoil shape may be created by a variable height of cross-beams of the frame. The airfoil shape allows the aircraft to support more weight without increasing the wing-span. The fuselage may have a relative flat shape. In some embodiments, the height of the fuselage is less than half the width of the fuselage. This flat profile helps forming an airfoil shape of the fuselage and to more effectively accommodate intermodal containers in the transverse direction.

Provided also is a method of loading intermodal containers into an aircraft. In some embodiments, the method involves arranging the intermodal containers on a flat surface in a row such that lengths of the intermodal containers extend perpendicular to the direction of the row. The method may also involve positioning the fuselage of the aircraft above the row of the intermodal containers. The fuselage may include a cargo space and an opening into the cargo space. The fuselage extends in the longitude direction along the row of the intermodal containers at the end of the positioning operating and the opening is aligned with the footprint of the containers. The longitude direction coincides with the direction of the row. The method then proceeds with lowering the aircraft such that the intermodal containers are inserted into the cargo space of the fuselage during lowering. Each intermodal container is engaged with a supporting mechanism in the cargo space at the end of lowering.

In some embodiments, arranging the intermodal containers involves corner locking of at least one adjacent pair of the intermodal containers. In some embodiments, each intermodal container is corner locked with at least one other container prior to loading the containers into the aircraft. A container surrounded by two adjacent containers may be corner locked with both of these containers.

In some embodiments, the flat surface supporting the intermodal containers is raised relative to a surface supporting the aircraft, e.g., relative to the tarmac of an airfield. For example, the intermodal containers may be arranged into a row on a loading platform. The platform may not protrude past the footprint of the containers after they arranged into the row. The platform may be raised relative to the surface supporting the aircraft. This feature eliminates the need to lower the entire aircraft to load the containers into the aircraft.

In some embodiments, less than the maximum possible number of containers is loaded into the aircraft. For example, the aircraft may be partially loaded already at a different location. In some embodiments, the aircraft may be flown with fewer that the maximum possible number of containers. Furthermore, the weight of the intermodal containers loaded into the aircraft may vary by at least about 20% or even at least about 40%. Because the intermodal containers are oriented transversally, the partial loading and/or the uneven weight distribution still allows operating the aircraft by arranging the containers to keep the average of the weights of all the containers in the middle of the aircraft.

The method of loading the intermodal containers into the aircraft may also involve raising the aircraft with the intermodal containers supported in the cargo space. During this operation, the intermodal containers are also raised above the flat surface, which was used to arrange containers into the row and support the containers before this operation. The method may also involve attaching a cover to the fuselage, wherein the cover closes the opening to the fuselage.

DETAILED DESCRIPTION

Figure 1A:
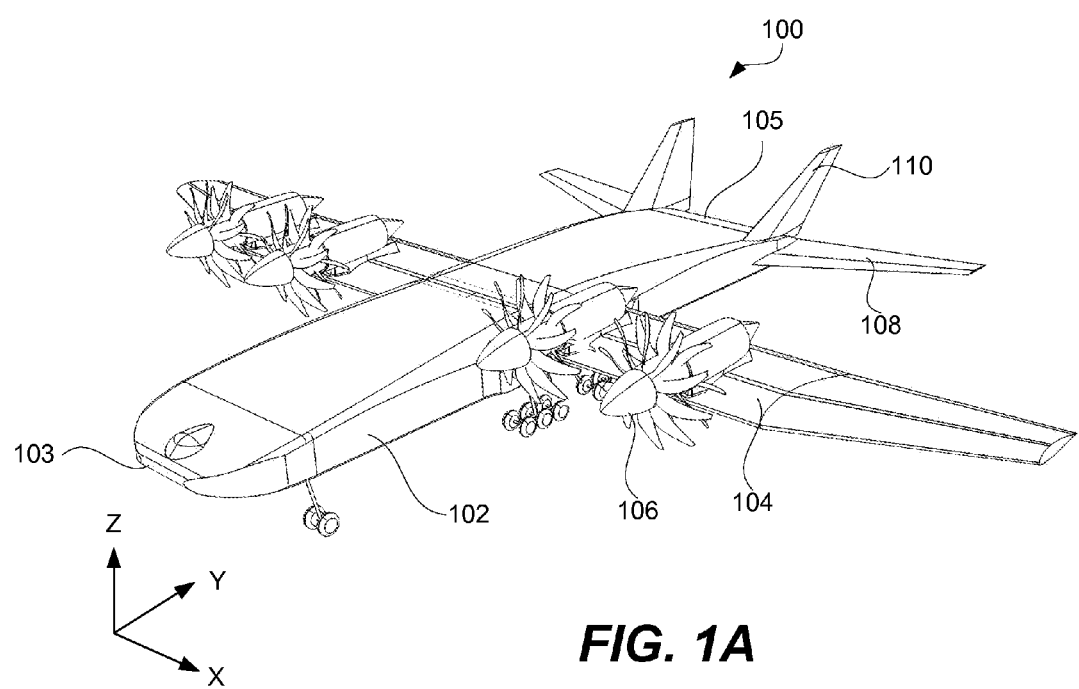
FIG. 1A is a top perspective view of an aircraft for transporting intermodal containers, in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

INTRODUCTION

Provided are aircraft for transporting intermodal containers and methods of operating such aircraft or, more specially, methods of loading and unloading such aircraft. These aircraft are environmentally-preferred, land-based, large capacity freighter. By reducing the fuel usage per ton of cargo transported, the environmental impacts of operating such aircraft are reduced. Furthermore, these aircraft are land-based and can be used in conventional airport environments. A land-based aircraft is an alternative to the sea based aircraft, which are often used for large cargo transport.

When loaded into an aircraft, the intermodal containers extend in the traverse direction, which for purposes of this disclosure is defined as a direction normal to the longitude direction extending from the nose to the tail end of the aircraft. To accommodate the intermodal containers in such orientation, the aircraft has a width greater than the length of standard intermodal container, which may be about 40 feet, 45 feet, or some other standard length. In some embodiments, the intermodal containers have a length of at least 30 feet measured in the transverse direction and a width of not exceeding 15 feet in the longitudinal direction. The traverse orientation of intermodal containers inside the cargo compartment of the aircraft allows reducing the surface area of the aircraft.

In some embodiments, the height of the fuselage of the aircraft is substantially smaller than its width, such as at least about twice smaller or even at least about four times smaller. A low aspect ratio of the fuselage (i.e., a ratio of its height to its width) can be used to form a fuselage into an airfoil shape and to provide additional lift the aircraft. This feature is particularly helpful for cargo aircraft carrying substantial weight as it allows reducing the wingspan. Such a flat profile of the fuselage is different from conventional round fuselages used on most modern air freighters. The conventional round fuselage may provide structural support needed to withstand pressurization forces associated with high altitudes. Furthermore, the use of round fuselage is often a consequence of air freighters being adapted versions of passenger aircraft.

The aircraft described herein may be operated at low-altitudes and, in some embodiments, at low speeds. Specifically, an aircraft may be configured to operate at less than 18,000 feet above the sea level. The cruising speed of the aircraft may be less than about 0.5 Ma (380 mph). The lower cruising speed (in comparison to the conventional cargo aircraft) reduces the airframe stress, provides greater aerodynamic efficiency, as well as other benefits. Furthermore, operation at low altitudes allows having an unpressurized cargo space.

The transverse orientation of intermodal containers in an aircraft also allows using shorter aircraft in comparison to possible longitude orientations. For example, a standard 40-foot container has a width of only 8 feet. As such, an aircraft may carry as many as 18 transversely oriented containers and have a length of about 200 feet, which is less than the length of many large passenger aircraft, such as Airbus A380, Airbus A340, Boeing 747, or Boeing 777. This aircraft may be operated in many existing airports without a need for special taxi-ways and run-ways typically needed for oversized aircraft.

The aircraft may be loaded with standard intermodal containers used on ships, trains, and trucks or specially adapted (e.g., lighter) versions thereof. The specially adapted version may have the same size and shape as well as locking features as the standard containers. The weight reduction may come from use of lighter materials and/or changes to structural and/or enclosure features of the containers. A composite or a lightweight metallic structure may be used for intermodal containers. The intermodal containers used on aircraft may not need to withstand large stacking loads or inclement weather. In addition to 20-foot and 40-foot containers, containers of other standard sizes that provide still commonality with existing land- and sea-based transport infrastructures and handling equipment may be used.

Engines used on aircraft for transporting intermodal containers may be open-fan type engines or turbine engines, such as Boeing 777-class high bypass engines. In some embodiments, the engines are positioned on the top of the wings to provide more ground clearance for the engines, e.g., when the aircraft is lowered during loading of the intermodal containers.

Prior to loading of intermodal containers into an aircraft, the containers may be arranged on the ground or some loading platform. The containers may be arranged prior to the aircraft arrival. For example, the containers may be arranged into a single row in the transverse orientation, i.e., when the lengths of the containers are perpendicular to the direction of the row. The aircraft may be then rolled over this arrangement and lowered onto the containers. During the lowering operation, the containers protrude into the cargo space and engage with the supporting mechanisms therein. These pre-arrangement and simultaneous loading operations significant reduce the turn time and provide substantial cost savings in comparison to conventional loading of cargo aircraft through a loading port in the tail end of the aircraft and/or individual handling of the containers during loading of the aircraft. Furthermore, this novel aircraft does not need to include structure and equipment for individual handling of each container, such as a load bearing cargo floor, cranes, rails, and/or conveyors. In some embodiments, corners of some or all adjacent containers are interlocked to provide additional support to the containers during transportations. This corner interlocking may be performed prior to loading of the containers into the aircraft.

The fuselage may have an opening at the bottom to allow intermodal containers into the cargo space. The opening is larger than the footprint of the arranged containers. The opening may remain uncovered during the flight. Alternatively, the aircraft may have a removable cover that encloses the opening.

The landing gear may have a track wider than the container length such that the aircraft can roll over the row of transversely orientated containers. In this example, the row is positioned between the landing gear and underneath the fuselage. In some embodiments, the forward gear also has a track greater than the length of the containers.

In some embodiments, the gear is configured to retract and extend, which may be referred to as kneeling, while supporting the weight of the loaded aircraft. For example, during loading, the gear may extend such that the ground clearance of the fuselage is greater containers' height. In this raised position, the aircraft may drive over the containers such that the opening in the bottom of the fuselage is aligned with the containers. The gear may then retract to lower the fuselage onto the containers. During this operation, the containers protrude through the opening and into the cargo space. Inside the cargo space, the containers are engaged by one or more supporting mechanisms. The supporting mechanisms may engage the top corners and/or the bottom corners of the containers. The engagement may be performed while the containers are still on the ground or some loading platform. The gear may then extend to raise the fuselage of the ground and prepare the aircraft for takeoff.

Aircraft Examples

A brief description of aircraft is presented to provide better understanding of various features used for transporting intermodal containers in the aircraft. FIG. 1A illustrates a perspective top view of aircraft 100, in accordance with some embodiments. Aircraft 100 includes fuselage 102 extending in the longitude direction (shown as the Y direction) between nose 103 and tail 105 of aircraft 100. Fuselage 102 includes a cargo space for receiving intermodal containers extended in the transverse direction (shown as the X direction). Fuselage 102 also provides structural support for other components of aircraft. Fuselage 102 may be shaped as an airfoil as further described below with reference to FIG. 7.

Aircraft 100 includes wings 104 structurally coupled to fuselage 102. Wings 104 and/or fuselage 102 may contain fuel tanks. Engines 106 may be directly mounted on wings 104 (as shown in FIG. 1A) or fuselage 102. More specifically, engines 106 may be mounted on the bottom of wings 104 relative to the ground or on the top of wings 104 (as shown in FIG. 1A). The top mounted engines provide more ground clearance and may be used when intermodal containers are loaded by lowering the aircraft onto the containers. Engines 106 may be turbine engines or propeller engines. When propeller engines are used, the propellers may be facing forward or backward. In some embodiments, propeller orientation is determined based on the location of a loading opening to allow more space for loading equipment around the aircraft. For example, side loading of intermodal containers may be performed through an opening in the front portion of the fuselage, in which case the propellers may face backward. Engines are selected based on the weight of the loaded aircraft, design of its fuselage and other components, desired speed, and other such factors.

Aircraft 100 also includes horizontal stabilizers 108 and one or more vertical stabilizers 110. Horizontal stabilizers 108 and/or vertical stabilizers 110 may be attached directly to fuselage 102. In some embodiments, vertical stabilizers are positioned at the outer ends of the horizontal stabilizers, one on each end.

Figure 1B:
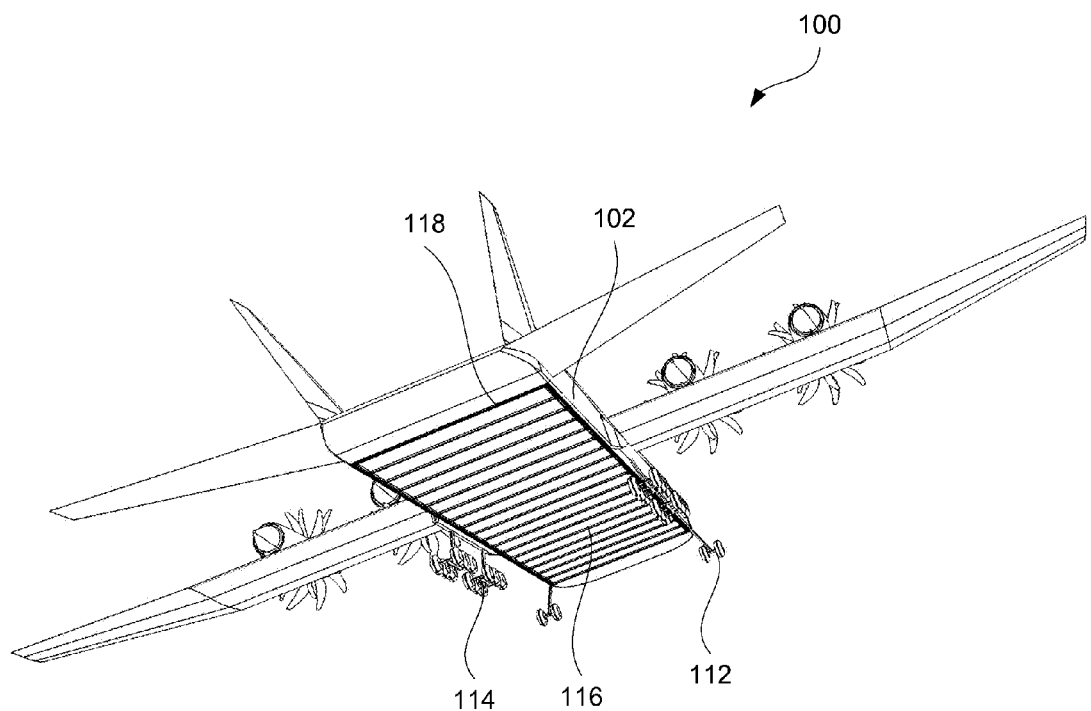
FIG. 1B is a bottom perspective view of the aircraft illustrating the intermodal containers disposed in the cargo space of the aircraft, in accordance with some embodiments.

FIG. 1B illustrates a bottom perspective view of the same aircraft 100 loaded with intermodal containers 116, in accordance with some embodiments. Also shown is landing gear 114 attached to fuselage 102. Landing gear 114 is shown in an extended position to illustrate the track of the gear. Aircraft 100 also includes front gear 112 attached to fuselage 102 and shown in an extended position. In some embodiments, fuselage 102 has an opening 118 for receiving intermodal containers 116 into the cargo space of fuselage 102. In FIG. 1B, opening 118 is shown as a rectangle surrounding intermodal containers 116. As such, opening 118 may be sufficiently large to receive all containers into the cargo space at the same time.

Figure 2A:
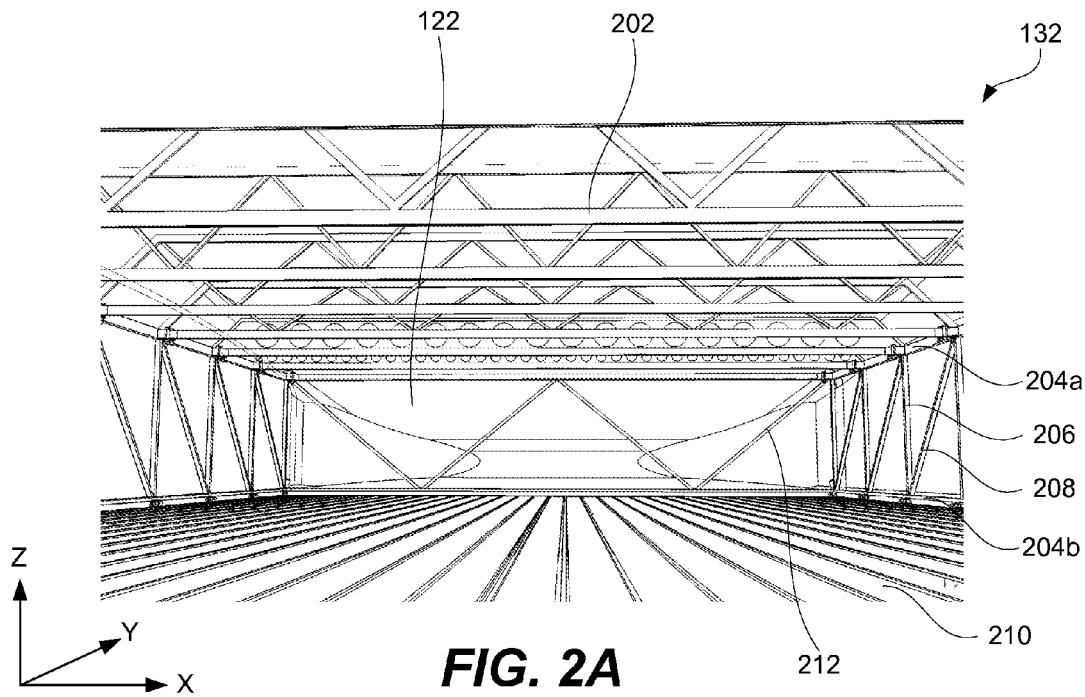
FIG. 2A is an inside view of the cargo space illustrating various components of the frame, in accordance with some embodiments.
Figure 2B:
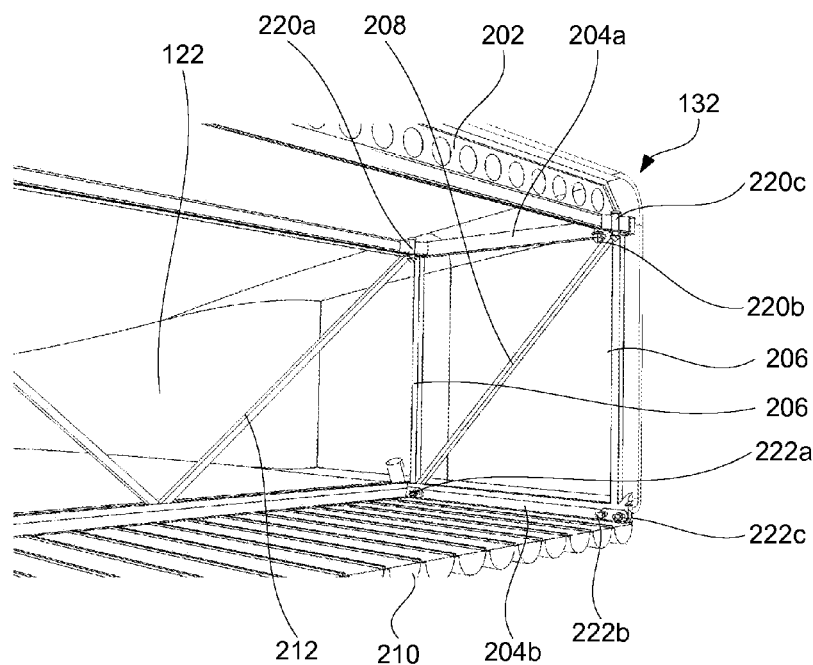
FIG. 2B is a partial view of the cargo space illustrating components of the frame, in accordance with some embodiments.

Intermodal containers 116 may remain exposed during the flight. In other words, opening 118 may remain uncovered. In some embodiments, intermodal containers 116 may be covered with a retractable cover (not shown in FIG. 1B) during the flight or, more specifically, after intermodal containers 116 are loaded into the cargo space of aircraft 100. At least one example of the cover is shown in FIGS. 2A and 2B and described with reference to these figures.

When intermodal containers 116 are loaded through opening 118 in the bottom of fuselage 102, landing gear 114 may have a track greater than the length of intermodal containers 116, which may be 40 feet or for variations of this embodiment, 45 or 53 feet. In some embodiments, front gear 112 may also have a track greater than the length of the container. In other embodiments, a single front gear may be provided in front of opening 118 such that loading of intermodal containers 116 does not interfere with this front landing gear. In this example, aircraft 100 may roll backward over a row of intermodal containers during loading.

Figure 1C:
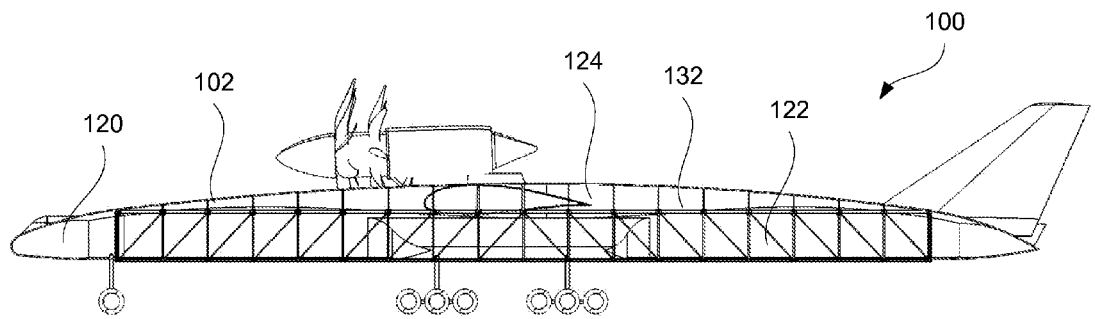
FIG. 1C is a side cross-sectional view of the aircraft for transporting intermodal containers illustrating a frame and the cargo space for receiving the intermodal containers, in accordance with some embodiments.

FIG. 1C illustrates a schematic cross-sectional view of aircraft 100, in accordance with some embodiments. Fuselage 102 may include three parts: cockpit 120, cargo space 122, and wing carry-through area 124. Cockpit 120 may be used by pilots and may include certain control equipment. In some embodiments, cockpit 120 may be the only pressurized portion of fuselage 102. Cargo space 122 and wing carry-through area 124 may remain unpressurized during the flight and, therefore, may operate at ambient pressure and temperature.

In some embodiments, an aircraft is a drone with no cockpit. The shuttle radar topography mission (SRTM) can be used to navigate such an aircraft. A cargo drone can fly at low speeds for long distances without concern for crew time and fatigue. The aircraft can therefore be designed for highly efficient flight profiles without accommodation for crew. For example, the entire fuselage may remain unpressurized.

Cargo space 122 may be defined by frame 132, which include various structural components further described below. A supporting mechanism for engaging with top corners of intermodal containers (not shown in FIG. 1C) may be connected to frame 132. Wing carry-through area 124 may include a wing support structure, which in some embodiments, may be a part of frame 132.

Figure 1D:
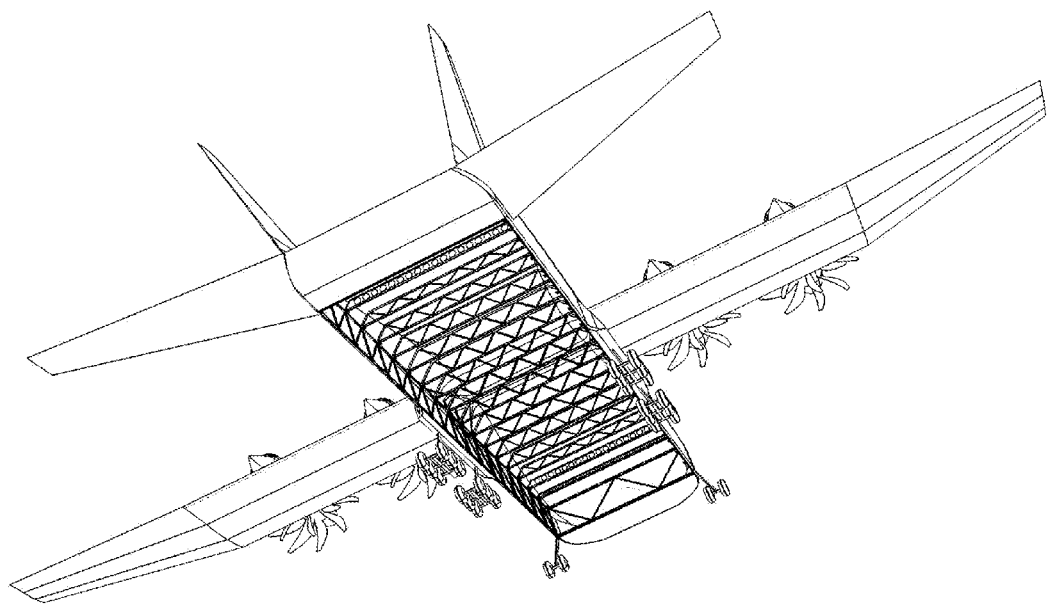
FIG. 1D is a bottom perspective view of the aircraft illustrating the cargo space for receiving the intermodal containers, in accordance with some embodiments.

FIG. 1D illustrates a bottom perspective view of aircraft 100 without any intermodal containers in the cargo space, in accordance with some embodiments. The cargo space is shaped to accommodate multiple intermodal containers in the transverse orientation or, more specifically, a row of the intermodal containers. For example, an aircraft designed to carry eighteen 40-foot intermodal containers may have a cargo space that is 40 feet wide (corresponding to a length of a container), 8 feet tall (corresponding to a height of a container) and 144 feet long (corresponding to a combined width of eighteen containers). In some embodiments, the cargo space may be divided into two or more sub-spaces with frame components extending between these sub-spaces. Furthermore, in some embodiments, the intermodal containers (e.g., the bottom corners of the containers and/or the top corners of the containers) may be rigidly attached to the frame to provide some structural support. In some embodiments, the aircraft can be operated with a partially loaded cargo space or empty cargo space. The bottom opening may be closed during such operation or with a reduced flight parameter envelope known to those skilled in the art.

Figure 1E:
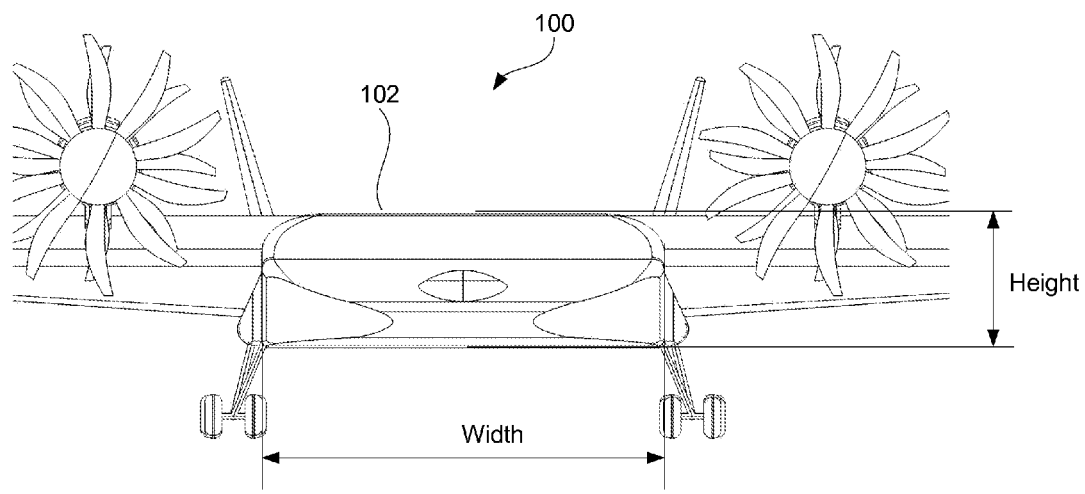
FIGS. 1E and 1F are front and back views of the aircraft for transporting intermodal containers illustrating a flat profile of the fuselage, in accordance with some embodiments.
Figure 1F:
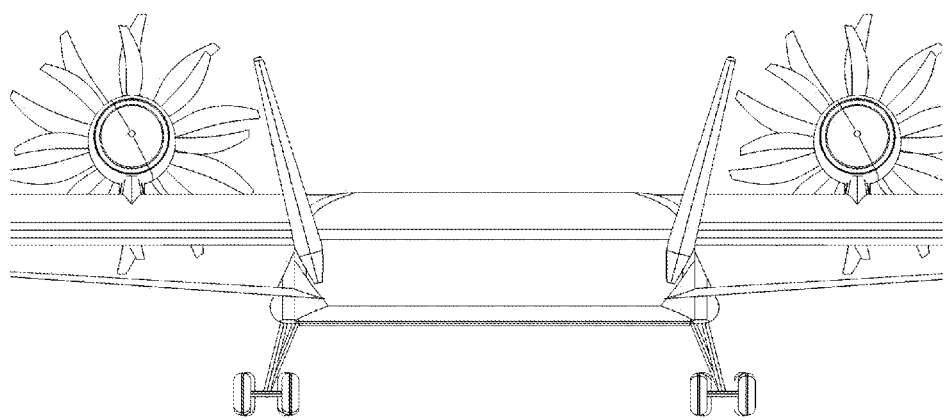

FIGS. 1E and 1F are front and back view of aircraft 100 with extended gears, in accordance with some embodiments. These figures illustrate profile of fuselage 102 and, more specifically, its width and height. Fuselage 102 may be designed to minimize the surface area of fuselage 102 in order to improve aerodynamic characteristics of aircraft 100 and reduce the overall weight. As such, the cross-section of fuselage 102 may generally follow the transverse profile of the intermodal container, which is typically an 8 feet by 40 feet rectangle and in variations of this embodiment may be other typical sizes such as an 8 feet by 45 feet rectangle or an 8 feet by 53 feet rectangle. The cross-section of fuselage 102 is generally larger than the transverse profile of the intermodal container in order to accommodate components of the frame and wing carry-through structure. In some embodiments, a height-to-width ratio of fuselage is less than two or, more specifically, less than four. The cross-section of fuselage 102 may be non-cylindrical unlike on conventional aircraft. In some embodiments, intermodal containers may partially protrude from the fuselage (e.g., extend from the bottom opening) during operating of the aircraft.

Examples of Cargo Space and Supporting Mechanism

FIG. 2A is an inside view of cargo space 122 illustrating various components of frame 132, in accordance with some embodiments. Specifically, frame 132 may include transverse beams 202, longitude beams 204a and 204b, vertical beams 206, and diagonal beams 208. These components define the boundary of cargo space 122 or, more specifically, three sides of this boundary. The fourth side may be defined by a cover 210, if one is present. Cover 210 may be removably attached to frame 132 or, more specifically, to bottom longitude beams 204b. Alternatively, the fourth side may be defined by the opening. In this example, a cover is not present, and cargo space 122 remains exposed to the environment.

In some embodiments, intermodal containers (not shown in FIG. 2A) may extend below bottom longitude beams 204b and even protrude outside of fuselage 102. The front and back boundaries of cargo space may be defined by structural walls 212 extending within the X-Z plane. In some embodiments, cargo space 122 is continuous in the Y direction. Alternatively, cargo space 122 may be divided into two or more sub-spaces by one or more middle structural walls.

In some embodiments, transverse beams 202 may have a variable height, which drives variation in the fuselage height since the cargo space height is constant (e.g., about 8 feet). For example, higher transverse beams may be used in the wing area to form adequate structural support for the wings. Furthermore, this variation may be used for airfoil-shaped fuselages.

FIG. 2B is a partial view of cargo space 122 illustrating components of frame 132 and supporting mechanisms 220a-220c and 222a-222c attached to frame 132, in accordance with some embodiments. Supporting mechanisms 220a-220c and 222a-222c may include twist-lock fasteners for engaging corners of intermodal containers (not shown in FIG. 2B). Specifically, supporting mechanisms 220a-220c and 222a-222c include top supporting mechanisms 220a-220c and bottom supporting mechanisms 222a-222c. Top supporting mechanisms 220a-220c may be provided at intersections of transverse beams 202, longitude beams 204a and 204b, vertical beams 206. Such location of top supporting mechanisms 220a-220c may be used to efficiently distribute the load among different components of frame 132 without overstressing any one component. Each supporting mechanism may be used to engage a corner of an intermodal container. As such, each container may be engaged and supported by at least four top supporting mechanisms. In some embodiments, the same intersection of transverse beams 202, longitude beams 204a and 204b, vertical beams 206 may include two top supporting mechanisms, such as top supporting mechanisms 220b and 220c as illustrated in FIG. 2B. One of these two top supporting mechanisms is used to engage a corner of one container, while the other one is used to engage a corner of a different (adjacent) container.

Bottom supporting mechanisms 222a-222c may likewise be provided at intersections of transverse beams 202, longitude beams 204a and 204b, and vertical beams 206. In some embodiments, each container may be engaged and supported by four bottom supporting mechanisms in addition to four top supporting mechanisms. In some embodiments, bottom supporting mechanisms 222a-222c may be used to support cover 210.

Any corner of an intermodal container may be engaged one or more of three different directions: (1) in the vertical direction, which is a direction along the height of the container, (2) in the transverse direction, which is a direction along the length of the container, and/or (3) in the longitude direction, which is a direction along the width of the container. In some embodiments, top supporting mechanisms 220a-220c engage container corners in the vertical direction. Bottom supporting mechanisms 222a-222c may engage the corners in the transverse direction. This engagement direction of the bottom corners allows keeping the opening for loading the containers into the cargo space clear from any obstructions.

Top supporting mechanisms 220a-220c may automatically interlock the top corners of the loaded containers when top supporting mechanisms 220a-220c are inserted into the top corners during loading of the containers into the cargo space. In other embodiments, a separate engagement operation is performed. At least top supporting mechanisms 220a-220c may be engaged before lifting containers of the ground or some staging platform. Bottom supporting mechanisms 222a-222c may be engaged after the containers are lifted.

Figure 2C:
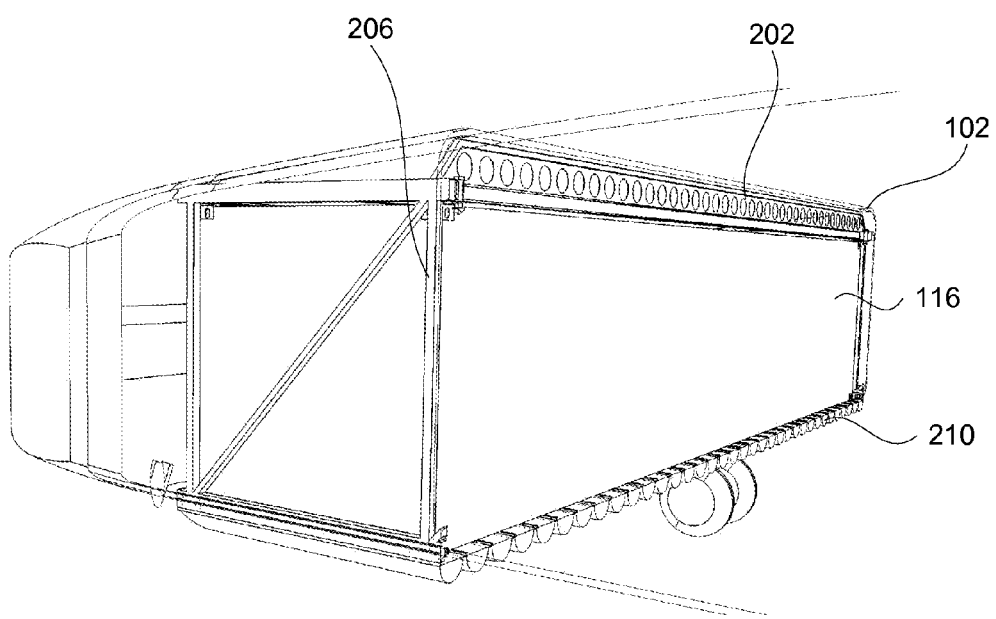
FIG. 2C is a perspective view of an intermodal container disposed in the cargo space, in accordance with some embodiments.

FIG. 2C is a perspective cross-sectional view of an intermodal container 116 disposed in the cargo space, in accordance with some embodiments. Four top supporting mechanisms (not visible) engage four top corners of container 116. Furthermore, four bottom supporting mechanisms (not visible) engage four bottom corners of container 116 and provide support to cover 210. The external surface of fuselage 102 is minimized by keeping this surface close to container 116. On the top, the external surface is only spaced apart from container by transverse beams 202 and the sheet metal of fuselage 102. Similarly, on the sides, the external surface is only spaced apart by vertical beams 206 and the sheet metal of fuselage 102.

Loading Examples

Figure 3:
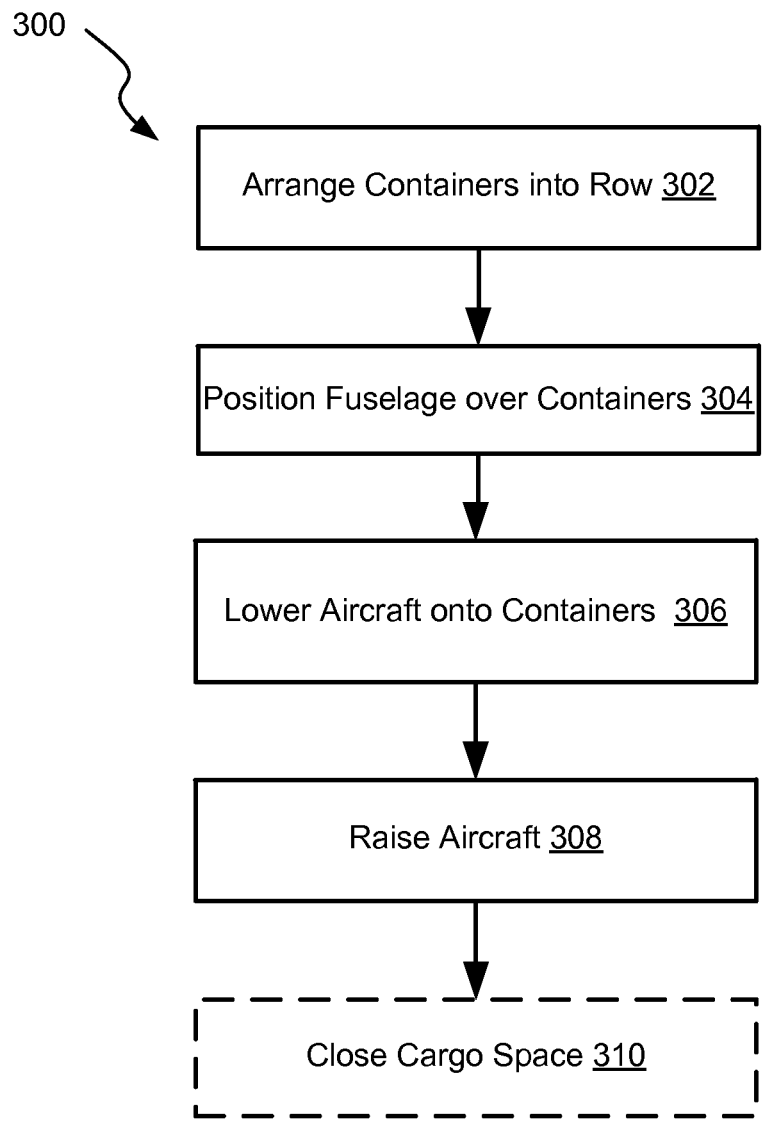
FIG. 3 is a flowchart corresponding to a method of loading intermodal containers into an aircraft, in accordance with some embodiments.

FIG. 3 is a process flowchart corresponding to method 300 of loading intermodal containers into an aircraft, in accordance with some embodiments. Method 300 may commence with arranging the intermodal containers in a row during operation 302. The intermodal containers may be generally arranged on a flat surface. This flat surface may be also used to provide support to the landing gear of the aircraft and may be, for example, a tarmac in an airport. In some embodiments, the flat surface used to support the arranged containers may be raised relative to the surface supporting the landing gear of the aircraft. This raised position of the containers allows lowering the aircraft onto the intermodal containers and completely inserting the intermodal containers into the fuselage without contacting the ground with the fuselage. For purposes of this disclosure, intermodal containers are considered to be completely inserted into the fuselage when the containers do not protrude past the fuselage boundary, such as past the opening at the bottom of the fuselage.

Figure 4A:
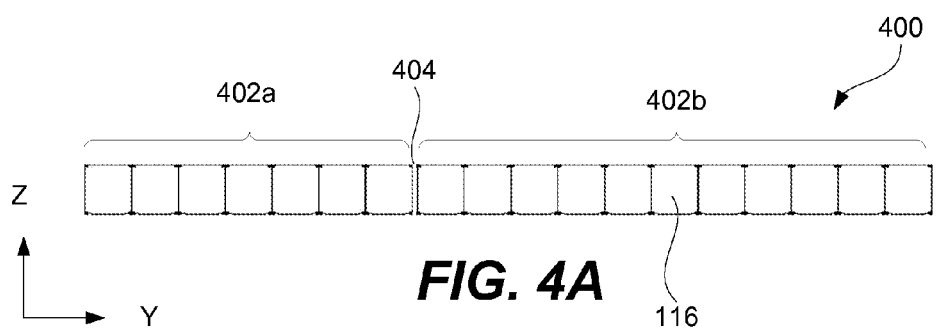
FIGS. 4A and 4B are side and top view of a row of intermodal containers prepared for loading into an aircraft, in accordance with some embodiments.
Figure 4B:
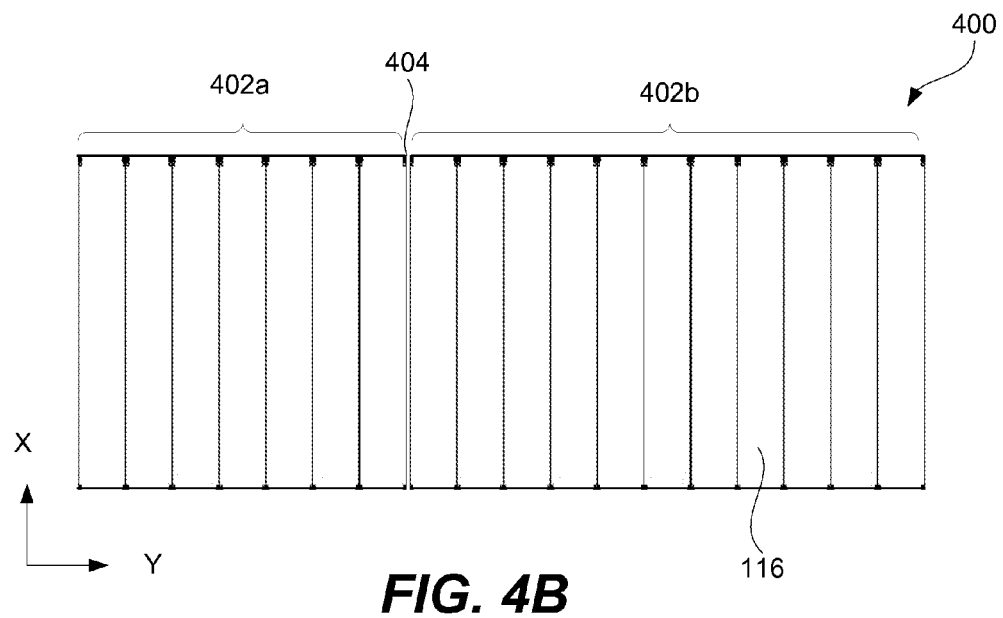

The intermodal containers are arranged into the row such that their lengths extend perpendicular to the direction of the row. FIGS. 4A and 4B illustrate side and top schematic views (respectively) of row 400 formed by eighteen intermodal containers 116, in accordance with some embodiments. As with the previous figures, the X direction corresponds to the traverse direction of the aircraft, while the Y direction corresponds to the longitude direction. As shown, the lengths of the intermodal containers, which may be about 40 feet or about 45 or 53 feet, extend in the X direction, while the row is formed in the Y direction, which is referred to as the row direction.

In some embodiments, two or more containers form a continuous row such that substantially no spacing is present between the containers forming the row. Alternatively, a row may have one or more gaps between two or more packs of containers forming the row. The gaps may be used to protrude various components of aircraft frame in between these packs when the containers are loaded into the cargo space. Specifically, FIGS. 4A and 4B illustrate two packs 402a and 402b forming row 400, in accordance with some embodiments. In this example, pack 402a is formed by seven intermodal containers, while pack 402b is formed by eleven intermodal containers. Packs 402a and 402b are separated by gap 404. In general, a row of the containers may include any number of packs, such as one or more packs. Each pack may include one or more containers. The two special cases include a single pack forming the entire row, in which no containers are separated by a gap, and packs formed by individual containers, i.e., each pack including only one container.

When a pack includes two or more containers, there are no gaps between the containers in the pack. Furthermore, some or all containers in the pack may be directly interconnected with each other. This direct interconnection between the containers should be distinguished from connections formed between individual containers and supporting mechanisms of the aircraft. The containers may be interconnected prior to loading these containers into the cargo space of the aircraft. Specifically, operation 302 may involve corner locking each adjacent pair of the intermodal containers. For example, twist-lock fasteners may be inserted into some or all pairs of adjacent corners of the intermodal containers. The twist-lock fasteners may extend in the longitude direction (the Y direction). The top corners and/or the bottom corners of the intermodal containers may be interconnected in such a way. In some embodiments, containers may be interconnected after being loaded into the cargo space of an aircraft. For example, interconnecting rails may be attached to the bottom corners of the containers.

Figure 5A:
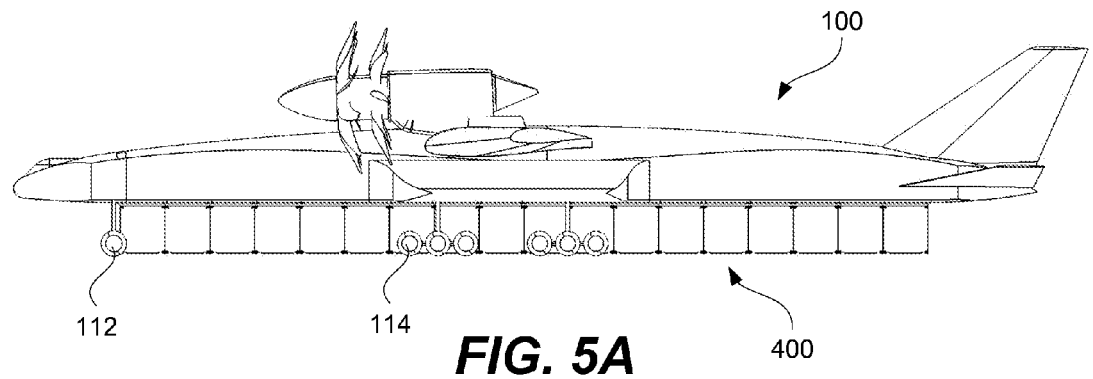
FIGS. 5A-5C are side, front, and expanded front views of an aircraft positioned above the row of intermodal containers prior to loading of the containers into the aircraft, in accordance with some embodiments.
Figure 5B:
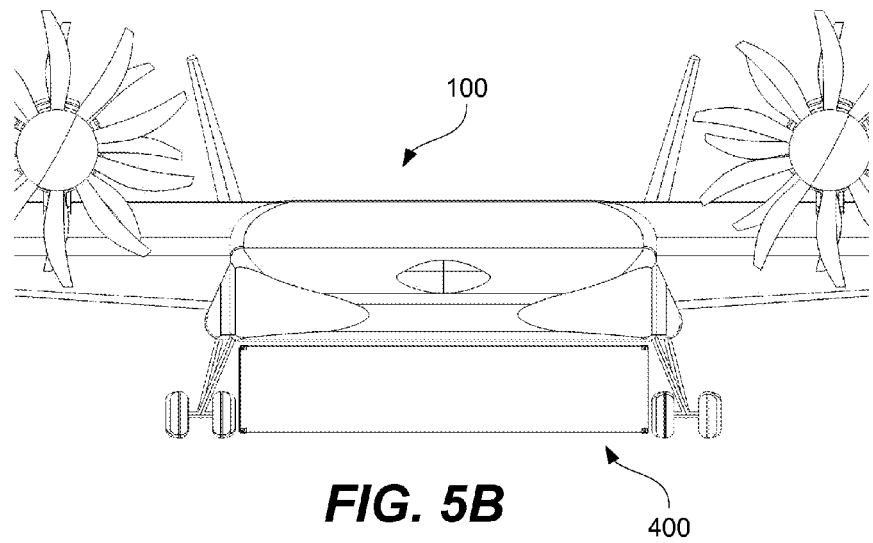
Figure 5C:
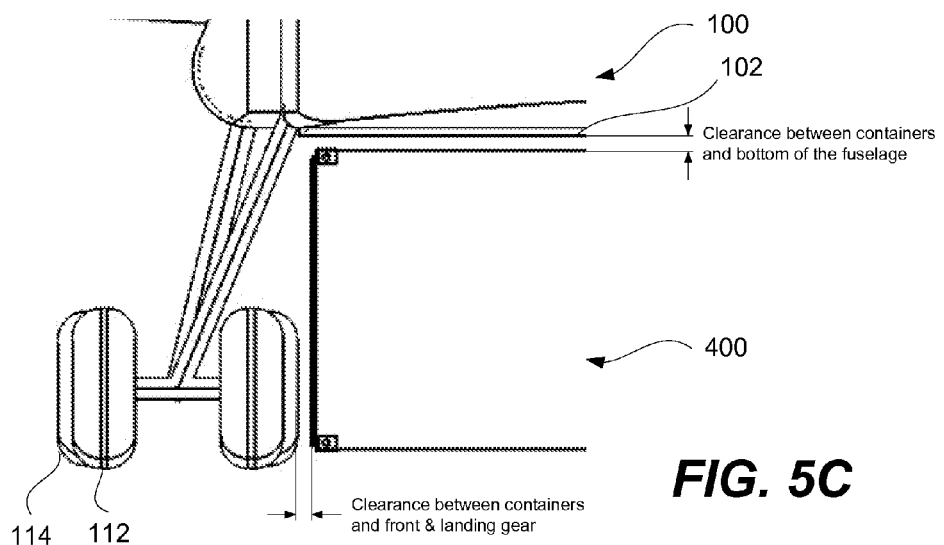

Method 300 may proceed with positioning the fuselage of the aircraft above the row of the intermodal containers during operation 304. For example, the aircraft may roll over the row of the intermodal containers and align its opening in the bottom of the cargo space with the container row. At the end of this operation, the fuselage extends along the row of the intermodal containers (in the Y direction). As described above, the landing gear in its retracted position may provide a ground clearance for the fuselage greater than the height of the containers (in the Z direction) so that the fuselage can extend over the row of the intermodal containers. Furthermore, a track of the landing gear may be wider than the length of the containers so that that the aircraft can roll over the containers. FIGS. 5A and 5B illustrate side and front views of aircraft 100 positioned over row 400 of the containers in some embodiments. Both front gear 112 and landing gear 114 are extended to provide enough clearance to fuselage 102 as more clearly demonstrated in FIG. 5B, which is expanded partial front view of aircraft 100 and container row 400. Furthermore, FIG. 5B illustrates the track of front gear 112 and landing gear 114 being greater than the length of the containers and providing sufficient clearance between the containers and front gear 112 and landing gear 114.

Figure 6A:
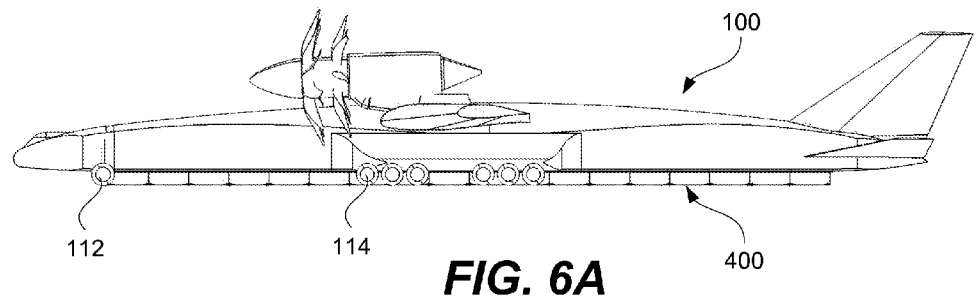
FIGS. 6A and 6B are side and front views of an aircraft during loading of intermodal containers into the aircraft, in accordance with some embodiments.
Figure 6B:
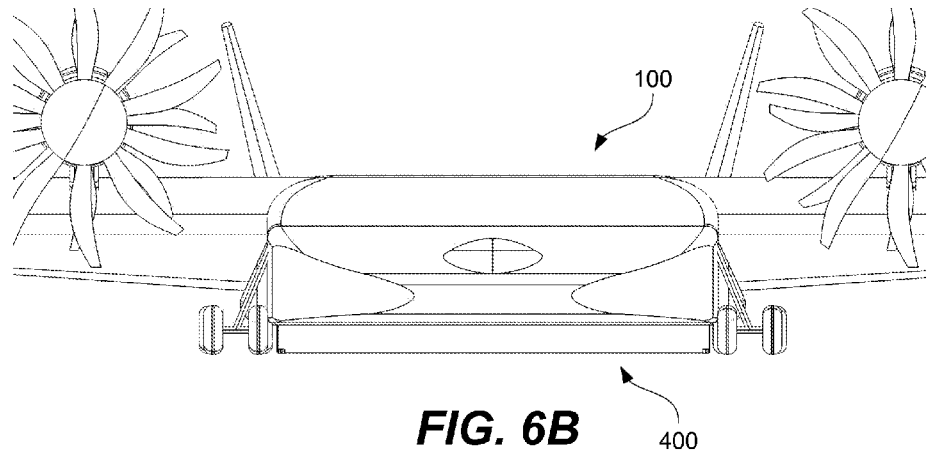
Figure 6C:
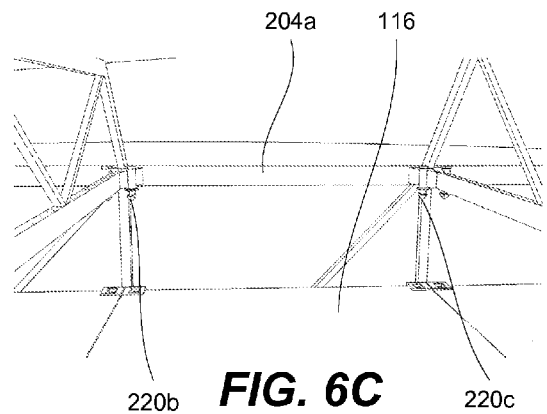
FIG. 6C is an inside view of the cargo space during loading of the intermodal containers into the aircraft, in accordance with some embodiments.

Method 300 may proceed with lowering the aircraft onto the row of the intermodal containers during operation 306. During this operation, the intermodal containers are inserted into the cargo space of the fuselage. FIGS. 6A and 6B illustrate side and front views of aircraft 100 being lowered onto row 400 of the containers in some embodiments. Furthermore, FIG. 6C illustrates an internal view of the cargo space during insertion of the containers into the cargo space. Specifically, intermodal container 116 is shown approaching but not yet engaging top supporting mechanisms 220b and 220c.

At the end of operation 306, each of the intermodal containers is engaged with one or more supporting mechanisms in the cargo space. Various examples of the supporting mechanism are described above with reference to FIGS. 2E-2G. For example, the top twist-lock fasteners supported by the frame of the aircraft may engage with the top corners of the intermodal containers. In some embodiments, the bottom corners of the intermodal containers are also engaged with twist-lock fasteners at the end of this operation. Alternatively, the bottom corners of the intermodal containers are engaged with twist-lock fasteners during another operation (e.g., during closing of the cargo space) or remain not engaged.

Figure 6D:
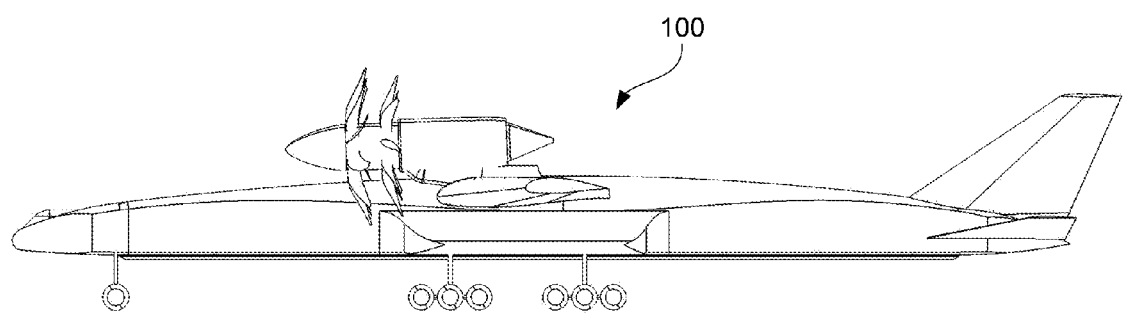
FIG. 6D is a side view of an aircraft after loading of the intermodal containers into the aircraft, in accordance with some embodiments.

Method 300 may proceed with raising the aircraft with the intermodal containers supported in the cargo space of the fuselage during operation 308. During this operation, the intermodal containers are also raised above the flat surface that was used to arrange containers during operation 302. FIG. 6D illustrates aircraft 100 loaded with containers, in accordance with some embodiments. Raising the aircraft creates a clearance between the intermodal containers and the flat surface used to support the containers prior to loading. This clearance allows the aircraft to move, e.g., for take-off. Furthermore, this clearance allows closing the opening into the cargo space during optional operation 310, for example, by attaching a cover to the fuselage, if the cover is used. Alternatively, the cargo space may remain open during operation of the aircraft. In this case, the bottom surfaces of the containers may be exposed and form the bottom surface of the aircraft.

Examples of Airfoil Fuselages

Figure 7A:
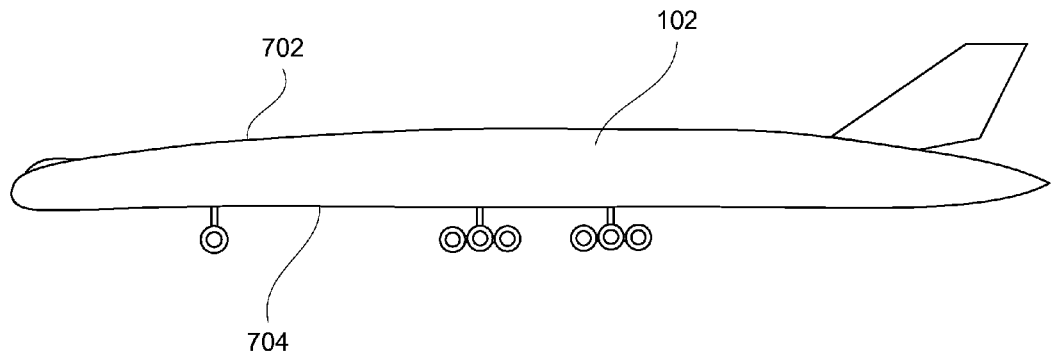
FIG. 7A is a side view of a fuselage of the aircraft illustrating the airfoil shape of the fuselage, in accordance with some embodiments.
Figure 7B:
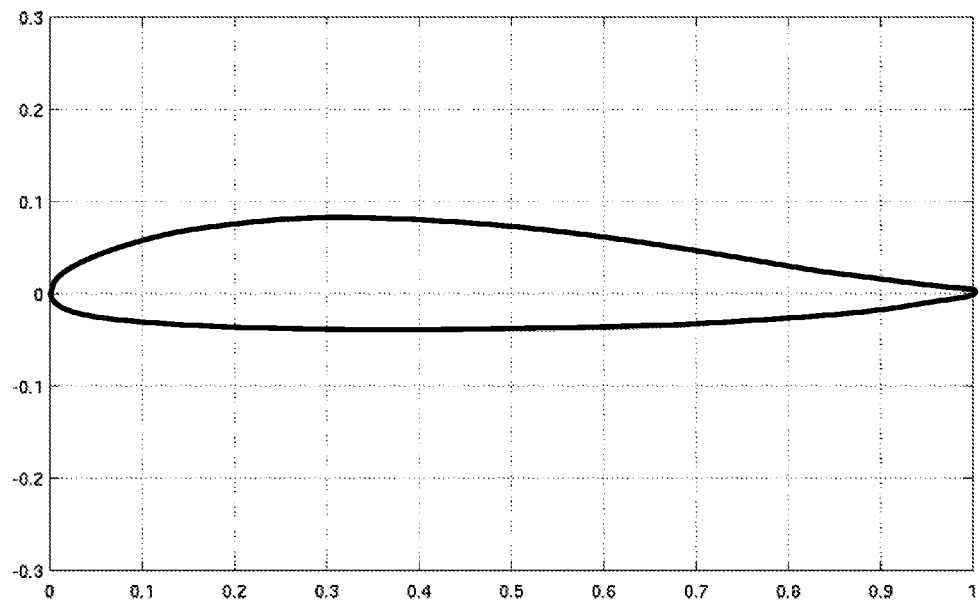
FIG. 7B illustrates an examples of an airfoil shape suitable for a fuselage, in accordance with some embodiments.

The flat cross-section of the fuselage allows shaping the fuselage as an airfoil providing an additional lift force to the aircraft thereby reducing the required wingspan. In some embodiments, the width-to-height ratio of the fuselage (e.g., along most of its length) is at least about two or, more specifically, at least about four. FIG. 7A illustrate a side view of fuselage 102 having upper surface 702 and bottom surface 704. In some embodiments, upper surface 702 may be longer than bottom surface 704 to ensure a faster flow of air above upper surface 702 than below bottom surface 704. Bottom surface 704 may be formed by bottom surfaces of intermodal containers or by the bottom cover. One example of an airfoil profile is presented in FIG. 7B. This shape may be suitable for a medium speed airfoil aircraft. It has a generally flat lower surface, which may be formed by a bottom cover of the aircraft. Furthermore, this airfoil shape has a positive pitching moment. The airflow may be improved by using a bottom cover rather than having exposed bottom surfaces of the intermodal containers. In some embodiments, the bottom cover may have channels extending in the longitude direction for controlling the airflow over its surface.

Aircraft Manufacturing and Components Examples

Figure 8:
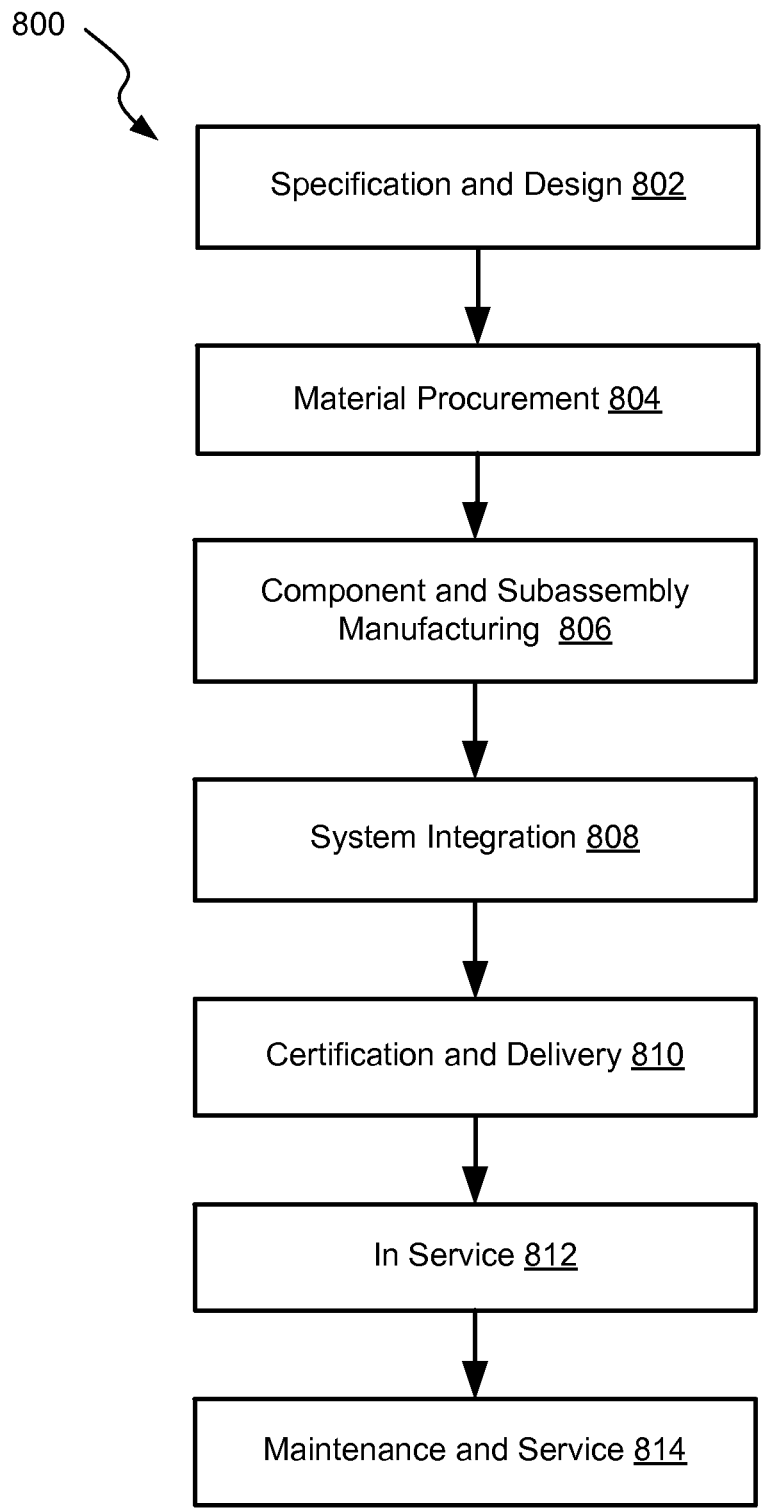
FIG. 8 is a flowchart corresponding to an aircraft manufacturing and service method, in accordance with some embodiments.

An aircraft manufacturing and service method 800 shown in FIG. 8 and an aircraft 900 shown in FIG. 9 will now be described to better illustrate various features of processes and systems presented herein. During pre-production, aircraft manufacturing and service method 800 may include specification and design 802 of the aircraft and material procurement 804. The production phase involves component and subassembly manufacturing 806 and system integration 808 of the aircraft. Thereafter, the aircraft may go through certification and delivery 810 in order to be placed in service 812. While in service by a customer, the aircraft is scheduled for routine maintenance and service 814 (which may also include modification, reconfiguration, refurbishment, and so on). While the examples described herein relate generally to servicing of commercial aircraft, they may be practiced at other stages of the aircraft manufacturing and service method 800.

Each of the processes of aircraft manufacturing and service method 800 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of vendors, subcontractors, and suppliers; and an operator may be an airline, leasing company, military entity, service organization, and so on.

Figure 9:
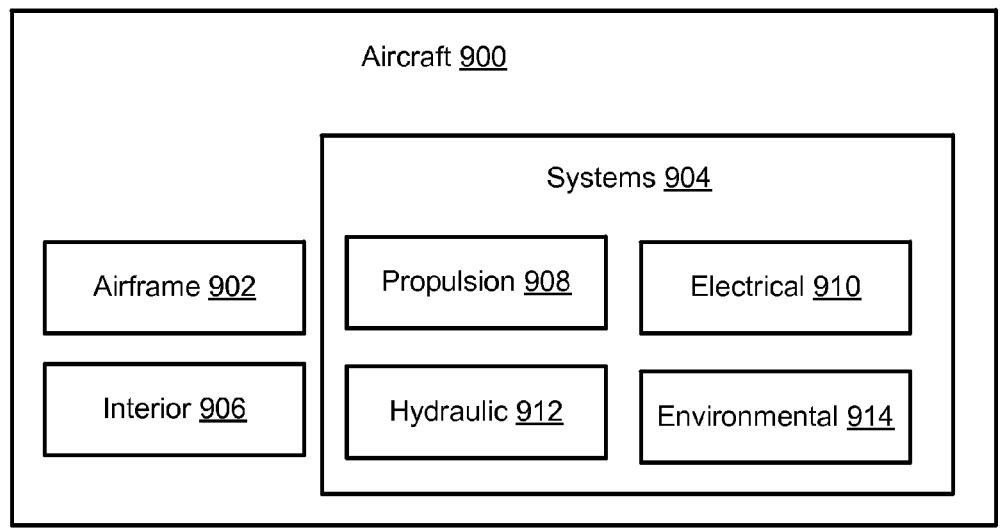
FIG. 9 is schematic illustration of various components and systems an aircraft, in accordance with some embodiments.

As shown in FIG. 9, aircraft 900 produced by aircraft manufacturing and service method 800 may include airframe 902, interior 906, and multiple systems 904 and interior 906. Examples of systems 904 include one or more of propulsion system 908, electrical system 910, hydraulic system 912, and environmental system 914. Any number of other systems may be included in this example. Although an aircraft example is shown, the principles of the disclosure may be applied to other industries, such as the automotive industry.

Apparatus and methods embodied herein may be employed during any one or more of the stages of aircraft manufacturing and service method 800. For example, without limitation, components or subassemblies corresponding to component and subassembly manufacturing 806 may be fabricated or manufactured in a manner similar to components or subassemblies produced while the aircraft is in service. Also, various features described herein may be utilized during aircraft component and subassembly manufacturing 806 and/or during system integration 808, which may expedite assembly of or reducing the cost of the aircraft. In some examples, these features may be utilized while the aircraft is in service, for example, during maintenance and service 814 of the aircraft.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present examples are to be considered as illustrative and not restrictive.

What is claimed is:

1. A method of loading intermodal containers into an aircraft, the method comprising:
arranging the intermodal containers on a flat surface in a row such that lengths of the intermodal containers extend perpendicular to the row;
positioning a fuselage of the aircraft above the row of the intermodal containers,
the fuselage comprising a cargo space and an opening into the cargo space,
the fuselage extending in a longitude direction along the row of the intermodal containers; and
lowering the aircraft,
wherein the intermodal containers are inserted into the cargo space of the fuselage during lowering of the aircraft, and
wherein each of the intermodal containers is engaged with a supporting mechanism in the cargo space after lowering.

2. The method of claim 1, wherein arranging the intermodal containers comprises corner locking at least one adjacent pair of the intermodal containers.

3. The method of claim 1, wherein the flat surface supporting the intermodal containers is raised relative to a surface supporting the aircraft.

4. The method of claim 1, further comprising raising the aircraft with the intermodal containers supported in the cargo space, wherein the intermodal containers are raised above the flat surface.

5. The method of claim 4, wherein, after raising the aircraft with the intermodal container, a bottom surface of the fuselage is formed at least in part by the intermodal containers.

6. The method of claim 4, further comprising attaching a cover to the fuselage, wherein the cover closes the opening to the fuselage.

7. The method of claim 6, wherein the cover has channels extending in the longitude direction for controlling airflow.

8. The method of claim 1, wherein the supporting mechanism in the cargo space comprises top twist-lock fasteners engaging top corners of the intermodal containers after lowering.

9. The method of claim 1, wherein the flat surface provides support to a landing gear of the aircraft while positioning the fuselage of the aircraft above the row of the intermodal containers and while lowering the aircraft.

10. The method of claim 1, wherein the row of the intermodal containers is continuous such that substantially no spacing is present between the intermodal containers forming the row.

11. The method of claim 1, wherein the row of the intermodal containers comprises two or more packs with a gap between each pair of adjacent packs of the two or more packs.

12. The method of claim 11, wherein a component of an aircraft frame protrudes into the gap between each pair of adjacent packs.

13. The method of claim 1, wherein the intermodal containers in the row are interconnected prior to lowering the aircraft.

14. The method of claim 1, wherein positioning the fuselage of the aircraft above the row of the intermodal containers comprises aligning the opening into the cargo space with the row of the intermodal containers.

15. The method of claim 1, wherein the aircraft has a ground clearance greater than a height of the intermodal containers.

16. The method of claim 1, wherein a track of a landing gear is wider than a length of the intermodal containers.

17. The method of claim 1, wherein the cargo space comprises top twist-lock fasteners engaging bottom corners of the intermodal containers after lowering.

18. The method of claim 1, wherein the fuselage has an airfoil shape.

19. The method of claim 18, wherein a ratio of a width to a height of the fuselage is at least about two.

20. The method of claim 18, wherein a ratio of a width to a height of the fuselage is at least about four.

* * * * *